US006105922A

United States Patent [19]

Derman

[11] Patent Number: 6,105,922

[45] Date of Patent: Aug. 22, 2000

[54] SUPPORT DEVICE FOR ATTACHING WIRE CABLE OR A PADLOCK SHACKLE TO PORTABLE EQUIPMENT

[76] Inventor: Jay S. Derman, P.O. Box 3823, Palos Verdes, Calif. 90274-9533

[21] Appl. No.: 09/370,189

[22] Filed: Aug. 9, 1999

[51] Int. Cl.[7] ........................... F16M 13/00; E05B 69/00; E05B 73/00; A47G 1/17

[52] U.S. Cl. ............................ 248/551; 70/58; 248/205.3

[58] Field of Search ................................ 248/205.3, 551, 248/552, 553; 70/14, 57, 58

[56] References Cited

U.S. PATENT DOCUMENTS

| | | | |
|---|---|---|---|
| 5,787,738 | 8/1998 | Brandt et al. | 70/58 |
| 5,787,739 | 8/1998 | Derman | 70/58 |
| 5,884,508 | 3/1999 | Dwight | 248/553 |
| 5,987,937 | 11/1999 | Lee | 248/553 |

*Primary Examiner*—Ramon O. Ramirez
*Assistant Examiner*—Jon A Szumny
*Attorney, Agent, or Firm*—Monty Koslover

[57] ABSTRACT

A support device for attachment to portable equipment that has no security slot, providing a simple, economic means for fastening and supporting a wire cable or padlock shackle to any portable equipment. The device assembly consists of a base pad that adheres to an equipment surface and provides a security hole, two identical plates that fit, back to back into the security hole in the base pad, and a cable support body that fits over the two plates, holding them together and preventing the plates coming loose. The plates include a fastening hole through which a wire cable or padlock shackle may be passed and rested on the support body. Provision is made for the plates and support body to be rotated 360 degrees to meet any needed angle of insertion for a cable or padlock shackle.

4 Claims, 1 Drawing Sheet

Fig. 1
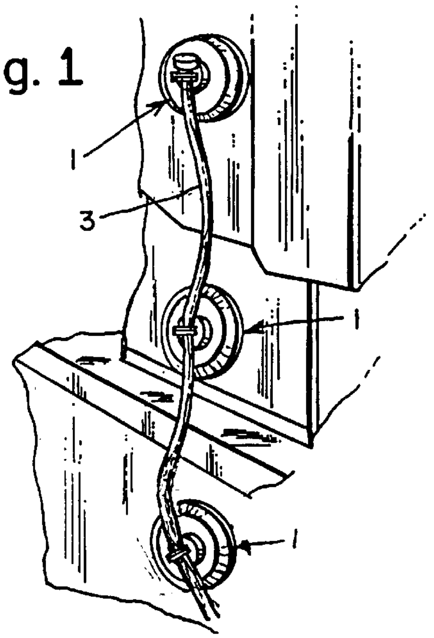
Fig. 2.
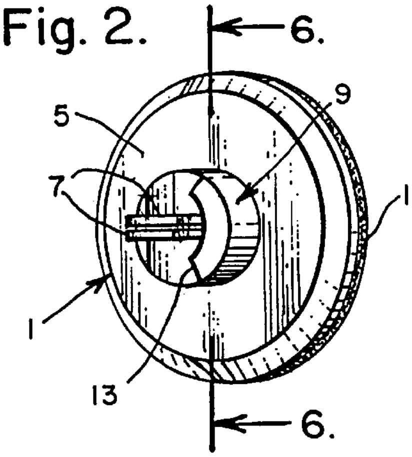
Fig. 3.
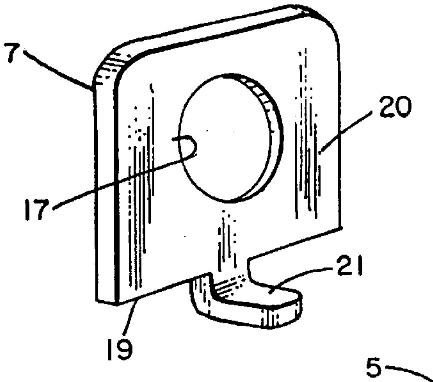
Fig. 4.
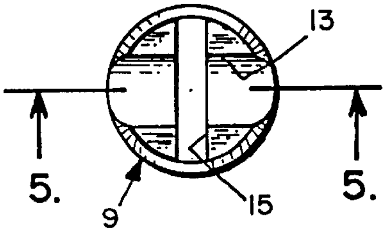
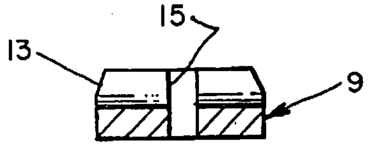
Fig. 5.
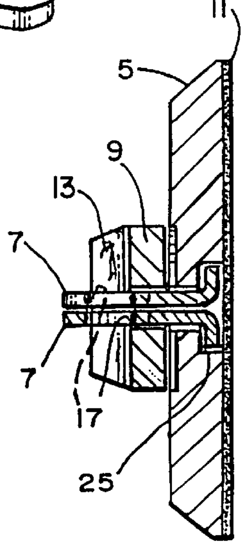
Fig. 6.

SUPPORT DEVICE FOR ATTACHING WIRE CABLE OR A PADLOCK SHACKLE TO PORTABLE EQUIPMENT

BACKGROUND OF THE INVENTION

1. Field of the Invention

This invention relates to devices used to attach a wire cable or padlock to portable equipment to secure the equipment in place.

2. Background and Summary of the Invention

There are many cable locking devices patented and available for sale, the most common use being for locking bicycles. However, there are few simple devices available for attaching cables or padlocks to portable equipment such as personal computers, laser printers or VCR's, which are otherwise easily removed by unauthorized people.

Some PC equipment incorporate security slots intended for use by devices that are inserted therein and may be used to attach a wire cable. There are a number of patented products that utilize these security slots, using differing methods.

However, many PC and other portable equipments do not yet incorporate these slots. This present invention addresses the continuing need for a simple, low cost method of attaching a cable or padlock shackle to portable equipment.

The present invention for a cable support and securing device for portable equipment was disclosed to the USPTO under the Disclosure Document Program filed Apr. 28, 1999.

In accordance with the invention, the device comprises two identical aperture plates that have a hole allowing a cable to pass through, and a dogleg tang below the hole in a plane 90 degrees; a support member that is fitted over both aperture plates when they are placed back to back with their dogleg tangs in a hole, and a metal or plastic geometrically shaped pad sufficiently thick for strength. Through the center of the pad, on an axis perpendicular to the pad plane, is an opening that is sized to accept the dogleg tangs of both aperture plates placed together, and there is a recessed hole in the bottom of the pad allowing the extended dogleg tangs and the aperture plates to be rotated. Attached to the bottom of the pad is a bonding material layer for adhering the base pad to an equipment. As assembled, the device provides a fastening aperture hole that is extended outward away from the surface of any portable equipment to which the device is adhered. This aperture hole provides easy access for insertion of a wire cable or a padlock shackle.

When a wire cable or padlock shackle is passed through the holes in the two aperture plates, the support member is prevented from being removed by the cable and holds the aperture plates firmly to the pad.

Accordingly, a prime object of this invention is to provide a means for attaching a wire cable or padlock shackle to portable equipment for the purpose of securing the equipment.

Another object is to provide a cable attachment and support device that is simple, very low cost and easy to use.

An advantage is that the aperture plates may be rotated in the base pad, increasing the device flexibility of use in close quarters.

Further objects and advantages of the invention will be apparent from studying the following portion of the specification, the claims and the attached drawings.

BRIEF DESCRIPTION OF THE DRAWINGS

FIG. 1 is a generally perspective, partial view of the preferred embodiment device being used with a cable to secure two equipments to a table;

FIG. 2 is a top perspective view of a support device for cables according to the present invention;

FIG. 3 is a perspective view of one of two identical aperture plates to which a cable may be attached;

FIG. 4 is a top view of a second member that fits over the two back-to-back aperture plates, preventing them from coming apart and supports a cable or padlock shackle;

FIG. 5 is an elevation cross-section view of the second member, taken along line 5—5 of FIG. 4, particularly showing a slot through its center to accommodate two back-to-back aperture plates; and FIG. 6 is an elevation cross-section view of the assembled device taken along line 6—6 of FIG. 2.

DESCRIPTION OF THE PREFERRED EMBODIMENT

Referring particularly to the drawings, there is shown in FIG. 1 a view of one way in which the present invention cable support device may be used. In the illustration, one device 1 is adhered to the side of a PC monitor, another device 1 is adhered to the side of a PC and a third device 1 is adhered to the side of a table. A wire cable 3, having a fixed stop on one side is passed through a hole in each device 1. The wire cable can then be continued and used to secure other equipments, or it can be terminated by a padlock or other suitable support device. In close quarters, where the equipments can not be conveniently stacked and lined up with a fixed securing post or table, the top portion of the support device may be rotated after the device is adhered to an equipment. This may be necessary to match the angle through which the securing cable must be bent in order to be passed through the device attachment hole and thus secured.

Referring now to FIG. 2, there is shown a top perspective view of a preferred embodiment of the present invention attachment device 1. The attachment device 1 comprises a base pad 5 member which may be metal or a rigid plastic material, two identical aperture plates 7 that have tangs that are inserted, back-to-back in a hole in the base pad 5, a support member 9 that fits over the two aperture plates 7 when the plates are positioned back-to-back, and a bonding material layer 11 that fastens the base pad securely to any surface.

The device component assembly is clearly shown in FIG. 6 which is a cross-section view of the device taken along line 6—6 of FIG. 2. A circular recessed portion 25 is cut in the center of the base pad 5 bottom surface to accept the extended dogleg tangs of the aperture plates 7 and allow the aperture plates and tangs to be rotated if so desired.

Refer now to FIG. 3 which is a front perspective view of one of two identical metal aperture plates 7. These aperture plates are described in U.S. Pat. No. 5,787,739 by the present applicant, and are hereby incorporated herein. As shown, the aperture plate 7 is made of sheet metal, formed into two planes. It may also be formed of a hard, rigid plastic. The upper portion 20 as shown, has side edges and straight bottom edges 19. Extending from the center of the bottom edges 19 is a dogleg shaped tang 21, bent in a plane that is approximately 90 degrees to the plane of the upper portion 20. The tang 21 is sized to be inserted into a center hole in the base pad 5, with room for a second tang to be inserted in the hole back-to-back as shown in FIG. 6, so that both tangs can hook on firmly to the under side of the base pad 5. The plates 7 and support member 9 may be rotated 360 degrees if so desired. It should be noted that the shape of the plate 7 upper portion 20 may be varied or curved if so desired, as long as its surfaces are planar.

A hole 17 is cut in the approximate center of the plate upper portion, and has a diameter sized to allow a wire cable or padlock shackle to be passed through when the assembled device is in use.

The support member 9, as shown in FIGS. 4 and 5, has a curved groove 13 cut or formed in its top surface across its transverse center axis, and a slot 15 cut and centered on its vertical center axis. The width and depth of the curved groove 13 is shaped and located to align with the lower half of a hole 17 that is cut in the aperture plates 7, to permit a wire cable to pass through the facing aperture plate holes and over the support member 9. The slot 15 is cut wide enough to allow the support member 9 to hold both aperture plates 7 firmly against each other with little clearance, preventing either plate from being removed from the base pad 5 center hole while the support member 9 encloses the plates together on all four sides.

When attached to an equipment or other surface, the support member can be rotated 360 degrees to support any angle of cable insertion, thereby helping where available space is tight and the equipment location may be awkwardly placed.

While the use of the above device is predicated primarily for portable equipment having no conveniently placed security slots, it is apparent that the device using only the two aperture plates 7 and the support member 9, may be used for attaching a cable to equipment having security slots. The slots may be rectangular or round in shape. Both slot types can be used to hold the plate tangs 21 in place.

As described above, the device is simple in concept and design and economic to produce. Its use is straightforward, requiring no elaborate preparations. The adhesive used to bond the device to equipment is tough, reliable, and not easily removed, ensuring a secure attachment.

It is clear that the preferred embodiment described above achieves the objects of the present invention. Alternative embodiments and various modifications may be apparent to those skilled in the art. These alternatives and modifications are considered to be within the spirit and scope of the present invention.

What is claimed is:

1. A support assembly for attachment of a cable or padlock shackle to portable equipment, said support assembly comprising:

(a) a first aperture plate defining an upper portion and a lower portion, said upper portion defining a first planar zone having width, length, thickness, a lower edge and side edges, said lower portion defining a tang that is connected to said upper portion at the center of said lower edge, and bent, projecting in a second planar zone approximately 90 degrees to said first planar zone;

first means including a first opening running through said upper portion of said aperture plate and adapted to fit a wire cable diameter or padlock shackle, allowing a wire cable to pass through said first opening;

(b) a second aperture plate that is identical to said first aperture plate, including said first means;

(c) a support body member having a slot running through it, said slot having a length and width sized to allow said support body member to fit over the upper portions of said first aperture plate and said second aperture plate when both said upper portions abut each other, back to back;

second means including a transverse groove in the top surface of said support body member, said groove being located, shaped and sized to allow a wire cable to rest therein and to pass through said first opening in said aperture plates when said support body member is placed over said aperture plates;

(d) a base pad member defining a third planar zone, shaped geometrically and having a width and depth;

third means including a second opening running through the center of said planar zone, perpendicular to its top surface, and including a circular recessed portion in the bottom surface of said planar zone, centered on said second opening; said second opening having a diameter sufficient to allow passage of both tangs of said aperture plates, pressed together with clearance; said recessed portion having a diameter and depth sufficient to permit the bent portion of said tangs to hook on to said base pad member and to permit 360 degree rotation of said tangs and thereby, also of said aperture plates; and (e) a bonding material layer for adhering said fastening assembly to a portable equipment or other surface, said bonding material layer being sized and shaped to adhere to the bottom surface of said base pad member;

said support assembly being assembled by first inserting the tang of one said aperture plate into said second opening of said base pad member, then inserting the tang of the second said aperture plate into said second opening positioned such that the faces of the aperture plate upper portions directly abut and the first opening in each plate directly aligns; then placing said support body member over said plate upper portions, moving it down until said transverse groove matches the lower half of said first opening, allowing a cable or padlock shackle to be inserted therein and passed through said first opening, thereby preventing said support body member from being removed and the aperture plates from being disengaged.

2. The support assembly according to claim 1, wherein said first and second aperture plates are formed from metal sheet.

3. The support assembly according to claim 1, wherein said support body member is formed from a rigid, hard plastic material.

4. The support assembly according to claim 1, wherein said base pad member is formed from a rigid, hard plastic material.

* * * * *